No. 836,672. PATENTED NOV. 27, 1906.
F. M. FOOTE.
BALL BEARING.
APPLICATION FILED FEB. 21, 1906.
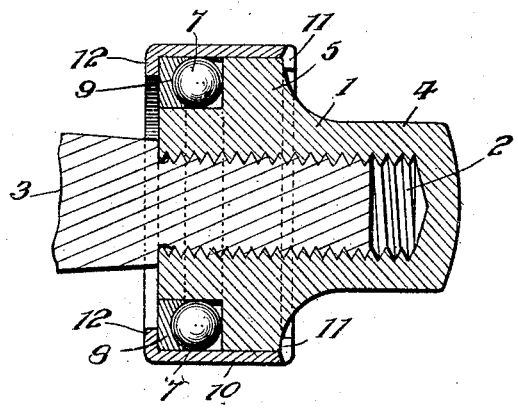
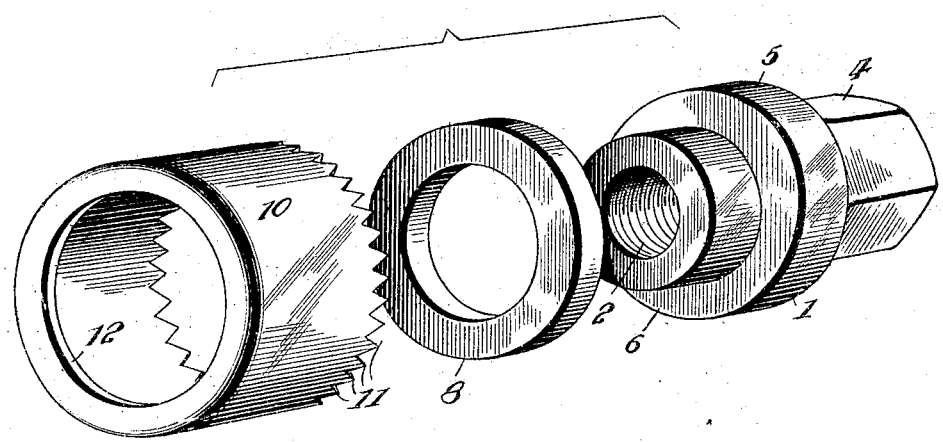
Inventor
F. M. Foote,
Witnesses
By R. H. A. A. Lacey, Attorneys
THE NORRIS PETERS CO., WASHINGTON, D. C.

UNITED STATES PATENT OFFICE.

FRANK M. FOOTE, OF MARSHALL, MICHIGAN.

BALL-BEARING.

No. 836,672.  Specification of Letters Patent.  Patented Nov. 27, 1906.

Application filed February 21, 1906. Serial No. 302,272.

*To all whom it may concern:*

Be it known that I, FRANK M. FOOTE, a citizen of the United States, residing at Marshall, in the county of Calhoun and State of Michigan, have invented certain new and useful Improvements in Ball-Bearing Axle-Nuts, of which the following is a specification.

The present invention relates to that class of nuts which are commonly employed in connection with the axles of vehicles, and has for its object to provide a nut of this character embodying novel means for resisting the outward thrust of the wheel.

A further object is to accomplish the result by means of few and simple parts which are permanently connected to the nut and which can be very easily manufactured and assembled.

For a full description of the invention and the merits thereof and also to acquire a knowledge of the details of construction of the means for effecting the result reference is to be had to the following description and accompanying drawings, in which—

Figure 1 is a longitudinal sectional view through the nut, and Fig. 2 is a detail perspective view showing the parts as separated.

Corresponding and like parts are referred to in the following description and indicated in both views of the drawings by the same reference characters.

The numeral 1 designates the nut, which is internally threaded at 2, so as to fit upon the axle 3 in the usual manner. The outer portion of the nut is given a polygonal formation at 4, which enables it to be readily engaged by a wrench or similar tool, while the inner portion of the nut is enlarged at 5. The edge of the enlarged portion 5 is rabbeted at 6 to form an annular guideway for the bearing-rollers 7. A ring or washer 8, corresponding in size to the rabbeted portion 6, fits over the bearing-rollers 7 and has its inner face formed with an annular depression 9. This ring 8 is held in position by means of a collar 10, which fits loosely upon the enlarged portion 5 of the nut. The inner edge of the collar 10 is formed with an inwardly-extending flange 12, which engages with the ring 8 to hold the same against displacement. The outer edge of the collar 10 is formed with the teeth 11, which are bent inwardly after the collar has been placed in position, so that they fit around the enlarged portion 5 and prevent the collar from slipping off. With this construction it will be apparent that both the collar 10 and ring 8 are free to rotate upon the nut 1 and can turn with the wheel, so as to practically eliminate the friction caused by the outward thrust of the wheel.

Particular attention is directed to the method employed for securing the members in position, since this can be very quickly and economically accomplished by crimping the tongues 11 around the enlarged portion 5 of the nut.

Owing to the fact that the collar 10 is free to rotate as well as the ring 8 and can therefore come into engagement with the wheel of the vehicle, the necessity for a careful connection between the two members is obviated.

Having thus described the invention, what is claimed as new is—

1. The combination of a nut having a portion thereof enlarged, one of the edges of the enlarged portion being rabbeted, a series of bearing-rollers located within the rabbeted portion, a ring fitting over the bearing-rollers so as to rotate freely with respect to the nut, and a collar engaging with the ring to hold the same against displacement, the said collar being loosely mounted upon the before-mentioned enlarged portion of the nut and being provided with a series of tongues which are bent inwardly to hold the collar in position.

2. The combination of a nut having an edge thereof rabbeted, a series of bearing-rollers located within the rabbeted portion, a ring fitting over the bearing-rollers and rotating freely with respect to the nut, and a collar loosely mounted upon the nut and engaging with the before-mentioned ring, the said collar being adapted to rotate independently both with respect to the nut and the ring and also being provided with means whereby it is prevented from slipping off from said nut.

FRANK M. FOOTE.

Witnesses:
 LOUIS C. MILLER,
 F. G. POWERS.